United States Patent
Shim et al.

(10) Patent No.: US 10,915,764 B2
(45) Date of Patent: Feb. 9, 2021

(54) ROAD SURFACE DETECTING APPARATUS AND METHOD FOR DETECTING ROAD SURFACE

(71) Applicants: Hyundai Motor Company, Seoul (KR); Kia Motors Corporation, Seoul (KR)

(72) Inventors: Hong Gi Shim, Incheon (KR); Ki Woo Sung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

(21) Appl. No.: 16/182,336

(22) Filed: Nov. 6, 2018

(65) Prior Publication Data

US 2020/0057895 A1 Feb. 20, 2020

(30) Foreign Application Priority Data

Aug. 20, 2018 (KR) .................. 10-2018-0096909

(51) Int. Cl.
*G06K 9/00* (2006.01)
*E01C 23/01* (2006.01)
(Continued)

(52) U.S. Cl.
CPC ..... *G06K 9/00805* (2013.01); *B60G 17/0165* (2013.01); *E01C 23/01* (2013.01);
(Continued)

(58) Field of Classification Search
CPC ............... B60W 2420/43; G06F 16/29; G06F 16/2379; G06F 16/23; G01C 21/00; G01C 21/14; G01C 21/165; G01C 21/16; G01C 21/32; G01C 21/34; G01C 21/3407; G01C 21/36; G01C 21/3602; G01C 21/3623; G01C 21/3644; G01C 21/3691; G05D 1/00; G05D 1/0088; G05D 1/0212; G05D 1/0219; G05D 1/0221; G05D 1/0246; G05D 1/0251; G05D 1/0253; G05D 1/0278; G06T 7/40; G06T 2207/20081; G06T 2207/30252; G06T 2207/30256; G06T 2207/30261; G06T 1/00; G06T 1/007; G06T 7/00; G06T 7/97; G06T 7/60; G06T 7/70; G06T 7/73; G06T 7/90; G06T 15/00; G06T 17/00; G06T 17/05; G06K 9/6267; G06K 9/6259; G06K 9/626; G06K 9/6262;
(Continued)

(56) References Cited

U.S. PATENT DOCUMENTS

| 9,760,806 B1* | 9/2017 | Ning ..................... G06N 3/0454 |
| 2016/0253566 A1* | 9/2016 | Stein ........................ G06T 7/40 |
| | | 348/148 |
| 2017/0010618 A1* | 1/2017 | Shashua ............... G05D 1/0088 |

* cited by examiner

*Primary Examiner* — Anthony R Jimenez
(74) *Attorney, Agent, or Firm* — Morgan, Lewis & Bockius LLP

(57) ABSTRACT

A road surface detecting apparatus may include a camera configured to obtain an image of a front side of a vehicle including a road surface, and a processor configured to classify a road surface event based on a road surface detection model which is generated by performing training based on the obtained image. Accordingly, a stable riding feeling may be provided for the user by quantitatively detecting a road surface event through training and controlling the vehicle based on the detected road surface event.

15 Claims, 13 Drawing Sheets

(51) Int. Cl.
   *B60G 17/0165*   (2006.01)
   *G01B 11/30*    (2006.01)
   *G01B 11/24*    (2006.01)
   *G06K 9/62*     (2006.01)
   *G06T 7/40*     (2017.01)
   *G06T 7/00*     (2017.01)

(52) U.S. Cl.
   CPC .............. *G01B 11/24* (2013.01); *G01B 11/30* (2013.01); *G06K 9/6256* (2013.01); *G06K 9/6267* (2013.01); *G06T 7/40* (2013.01); *G06T 7/97* (2017.01); *G06T 2207/20081* (2013.01); *G06T 2207/30252* (2013.01)

(58) Field of Classification Search
   CPC ...... G06K 9/00; G06K 9/6201; G06K 9/6256; G06K 9/00798; G06K 9/007; G06K 9/00805; G06K 9/4604; G01B 11/20; G01B 11/24; G01B 11/30; E01C 23/00; E01C 23/01; B60G 17/0165
   USPC .......................................................... 701/37
   See application file for complete search history.

ROAD SURFACE DETECTING APPARATUS AND METHOD FOR DETECTING ROAD SURFACE

CROSS-REFERENCE TO RELATED APPLICATION

The present application claims priority to Korean Patent Application No. 10-2018-0096909, filed on Aug. 20, 2018, the entire contents of which is incorporated herein for all purposes by this reference.

BACKGROUND OF THE INVENTION

Field of the Invention

The present invention relates to a road surface detecting apparatus and a method for detecting a road surface.

Description of Related Art

There are driver safety information systems, such as a road surface friction display and a non-sensor tire pressure monitoring system, for example, an indirect tire pressure monitoring system (iTMNS), which provide information on driving states to the drivers.

The systems may be controlled based on vehicle characteristic parameters, such as wheel vibration depending on tire air pressure, tire lengthwise strength, surrounding temperature, tire temperature, wheel resonance frequency, carried vehicle load, and speed.

To optimize the performance of the system, road surface information is required. For example, the road surface information may be used to set or adjust the strength of the suspension in advance. Accordingly, the driver may safely drive the vehicle on a road, such as a pebble road, a recessed road, a speed bump, a sleeping policeman.

However, because there is a limit that the road surface information is measured by use of a smartphone-based application using global positioning system (GPS) information, an image captured by a vehicle mounted camera, and a laser sensor that scans a road surface, a technology of providing the user with safe driving by quantitatively detecting road surface information and providing road surface information in real time has been required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a road surface detecting apparatus that quantitatively detects a road surface event and provides a user with safe driving, and a method for detecting a road surface.

The technical problems to be solved by the present inventive concept are not limited to the aforementioned problems, and any other technical problems not mentioned herein will be clearly understood from the following description by those skilled in the art to which the present invention pertains.

According to various aspects of the present invention, there is provided a road surface detecting apparatus including a camera configured to obtain an image of a front side of a vehicle including a road surface, and a processor configured to classify a road surface event based on a road surface detection model which is generated by performing training based on the obtained image.

The processor may include a data collecting device configured to collect a first effective image and a second effective image from the obtained image, a pre-processing device configured to pre-process the first effective image, a training device configured to generate the road surface detection model by training the pre-processed first effective image, and a classification device configured to classify the road surface event based on the road surface detection model.

The first effective image may include a road image in which the road surface event is included.

The second effective image may include at least any one of a road extracted image in which the road surface event is included and a general road extracted image in which the road surface event is not included.

The pre-processing device may include a pre-processing training device configured to generate a pre-processing model by training segmentation of the road surface based on the second effective image.

The pre-processing device may segment a road region from the first effective image based on the pre-processing model.

The training device may generate the road surface detection model by training the pre-processed first effective image based on a region convolution neural network (R-CNN).

The road surface event may include at least any one of a state in which the road surface protrudes and a state in which the road surface is recessed.

The processor may update map information related to the vehicle based on the classified road surface event.

The processor may output a guide message that guides the detected road surface event based on the updated map information.

The processor may control rolling of the vehicle generated by the detected road surface event based on the updated map information.

According to various aspects of the present invention, there is provided a method for detecting a road surface, the method including obtaining an image of a road surface, generating a road surface detection model through training based on the image of the road surface, and classifying road surface event information by use of the road surface detection model.

The generating of the road surface detection model may include collecting a first effective image and a second effective image from the obtained image, pre-processing the first effective image, and training the pre-processed first effective image.

The first effective image may include a road image in which the road surface event is included.

The second effective image may include at least any one of a road extracted image in which the road surface event is included and a general road extracted image in which the road surface event is not included.

The pre-processing of the first effective image may include generating a pre-processing model by training segmentation of the road surface based on the second effective image.

The pre-processing of the first effective image may include segmenting a road region from the first effective image based on the pre-processing model.

The training of the pre-processed first effective image may include generating the road surface detection model based on a region convolution neural network (R-CNN)

The road surface event may include at least any one of a state in which the road surface protrudes and a state in which the road surface is recessed.

The method may further include after the classifying of the information related to the road surface event by use of the road surface detection model, updating map information related to the vehicle based on the classified road surface event, and outputting a guide message that guides the detected road surface event based on the updated map information.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
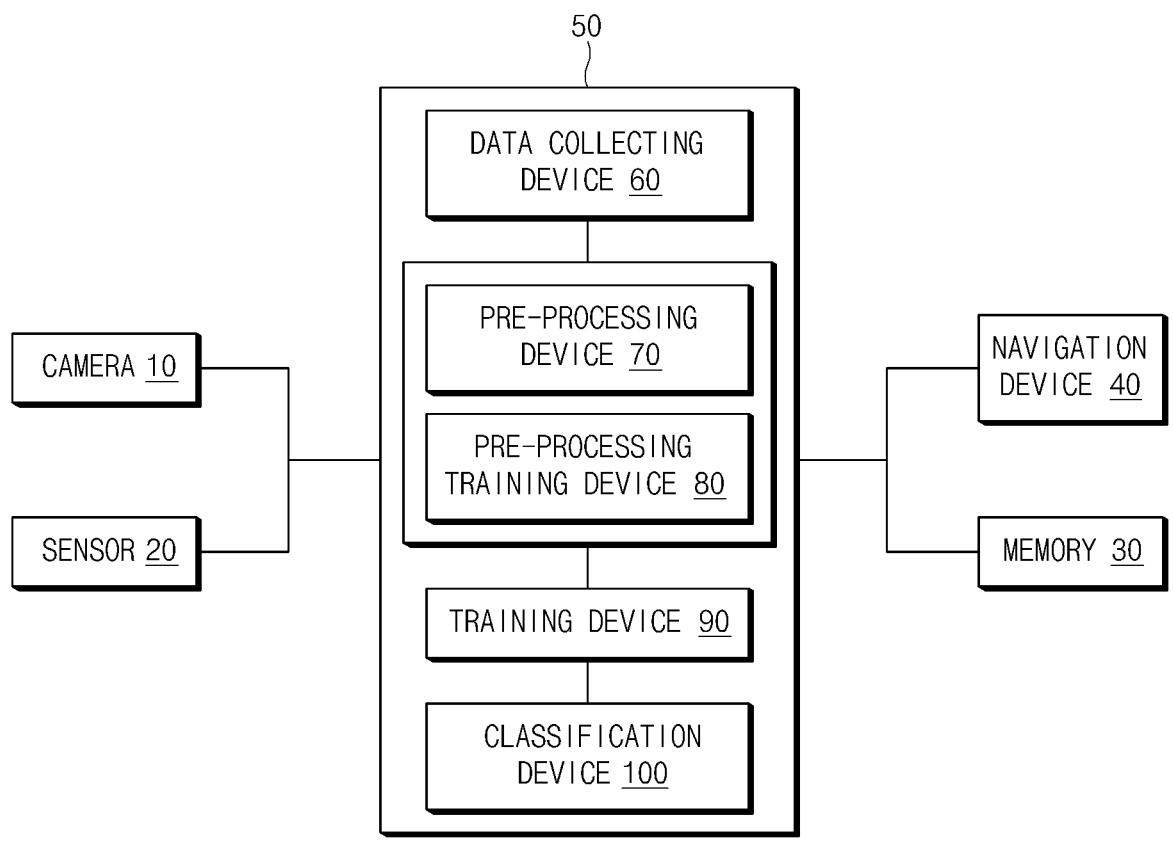
FIG. 1 is a block diagram illustrating a road surface detecting apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings. Throughout the specification, it is noted that the same or like reference numerals denote the same or like components even though they are provided in different drawings. Furthermore, in the following description of the present invention, a detailed description of known functions and configurations incorporated herein will be omitted when it may make the subject matter of the present invention rather unclear.

Furthermore, terms, such as first, second, A, B, (a), (b) or the like may be used herein when describing components of the present invention. The terms are provided only to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

FIG. 1 is a block diagram illustrating a road surface detecting apparatus according to an exemplary embodiment of the present invention.

As illustrated in FIG. 1, the road surface detecting apparatus according to an exemplary embodiment of the present invention may include a camera 10, a sensor 20, a memory 30, a navigation device 40, and a processor 50. For example, the road surface detecting apparatus may be included in a vehicle.

The camera 10 may photograph a front side of the vehicle including a road surface to obtain an image on the front side of the vehicle including the road surface. The camera 10 may be a camera included in a black box mounted on the vehicle. Furthermore, the camera 10 may include a front super wide angle camera configured to capture a front image of the vehicle, a rear super wide angle camera configured to capture a rear image of the vehicle, and a left super wide angle camera and a right super wide angle camera configured to capture left and right images of the vehicle.

The sensor 20 may detect rolling of the vehicle, and for the purpose, may include an acceleration sensor. The acceleration sensor measures an acceleration of the vehicle, and may include a transverse acceleration sensor and a longitudinal acceleration sensor. Here, rolling may refer to shaking generated due to an uneven road surface.

The memory 30 may store an electronic map received by the navigation device 40. Furthermore, one or more algorithms for an operation of the processor 50 may be stored. The memory 30 may include at least one type of storage medium of a flash memory type, a hard disk type, a multimedia card micro type, or a card type memory (for example, an SD or XD memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk.

The navigation device 40 may include a GPS device to receive information for determining a location of the vehicle from a GPS satellite and determine a location of the vehicle based on the information received from the GPS satellite. Furthermore, the navigation device 40 may include a communication device to receive the electronic device from a server and provide information related to a road on which the vehicle travels. The navigation device 40 may determine a route to a destination based on the location of the vehicle and the electronic map.

For example, the navigation device 40 may be realized by an audio video navigation (AVN) device, and may include a display configured to display information related to a road on which the vehicle travels or a route to a destination which a user intends to reach, and a speaker configured to output a sound according to a manipulation command of the user.

Here, the display may display a screen related to an additional function which may be executed by the AVN device, as well as various control screens related to the control of the AVN device. According to an exemplary embodiment of the present invention, the display may provide a navigation map screen, on which a travel route of the vehicle is displayed, according to an input of the user. The display may be realized by a liquid crystal display (LCD), a light emitting diode (LED), a plasma display panel (PDP), an organic light emitting diode (OLED), a cathode ray tube (CRT), or the like.

The processor 50 may perform an overall operation for detecting a road surface, which will be described in the detailed description of the present invention. In more detail, the processor 50 may include a data collecting device 60, a pre-processing device 70, a pre-processing training device 80, a training device 90, and a classification device 100.

The data collecting device 60 may collect a plurality of effective data (images) applied to training. In more detail, training images for training of detection of a road surface and pre-processing training may be collected as effective images. Hereinafter, for convenience' sake, an effective image for training of detection of a road surface will be referred to as a first effective image and an effective image applied to pre-processing training will be referred to as a second effective image.

The data collecting device 60 may collect one or more road images including a road from the image obtained by the camera 10 to collect the first effective image and the second effective image, and may collect one or more road extracted images including only a road region extracted from the image including the road. The road image may include a road image in which a road surface event is included and a general road image in which a road surface event is not included.

According to an exemplary embodiment of the present invention, the data collecting device 60 may identify a time at which rolling of the vehicle is generated based on the information detected by the sensor 20 to collect a road image in which a road surface event is included, and may collect a road region image captured before the corresponding time from the image captured by the camera 10.

A detailed description related to the first effective image and the second effective image will be made with reference to FIG. 2, FIG. 3 and FIG. 4.

Figure 2:
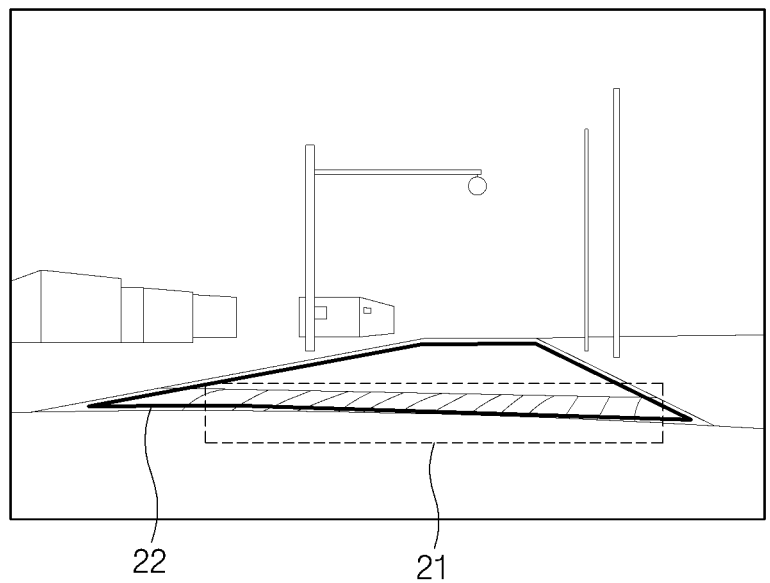
FIG. 2 is a view exemplarily illustrating a first effective image according to an exemplary embodiment of the present invention.

FIG. 2 is a view exemplarily illustrating a first effective image according to an exemplary embodiment of the present invention. FIG. 3 and FIG. 4 are views illustrating a second effective image according to an exemplary embodiment of the present invention.

As illustrated in FIG. 2, the first effective image may include a road image 22 in which a road surface event 21 is included. For example, the data collecting device 60 may collect an image, such as the image illustrated in FIG. 2, as the first effective image.

Figure 3:
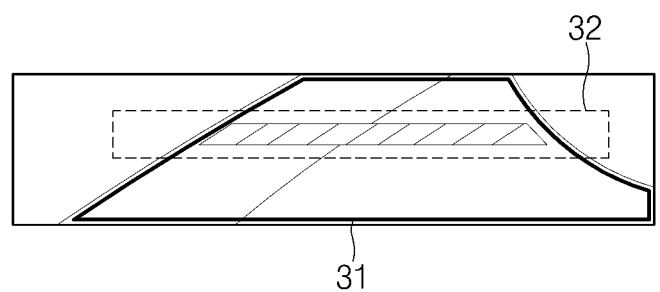
FIG. 3 and FIG. 4 are views illustrating a second effective image according to an exemplary embodiment of the present invention.
Figure 4:
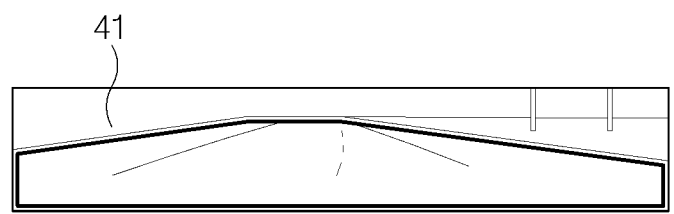

As illustrated in FIG. 3, the second effective image may include a road extracted image 32 in which a road surface event 31 is included, and as illustrated in FIG. 4, the second effective image may include a general road extracted image 41. The data collecting device 60 may collect an image, such as the image illustrated in FIG. 3 and FIG. 4, as the second effective image.

A road surface event may refer to any one road surface state of a state in which a road surface protrudes and a state in which the road surface is recessed, and may refer to a state of a road surface that causes rolling of the vehicle so that the user cannot be provided with a safety riding feeling. In more detail, a road surface event will be described with reference to FIG. 5, FIG. 6, FIG. 7, FIG. 8, and FIG. 9.

FIG. 5, FIG. 6, FIG. 7, FIG. 8, and FIG. 9 are views illustrating a road surface event according to an exemplary embodiment of the present invention.

Figure 5:
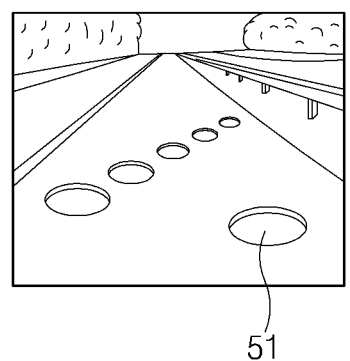
FIG. 5, FIG. 6, FIG. 7, FIG. 8, and FIG. 9 are views illustrating a road surface event according to an exemplary embodiment of the present invention.

As illustrated in FIG. 5, a road surface event 51 may include a pot hole which is a small hole which is locally formed on a surface of a road.

Figure 6:
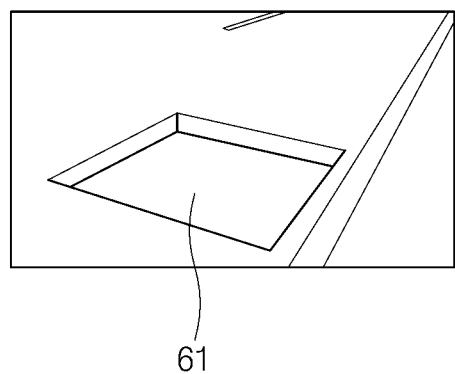
Figure 7:
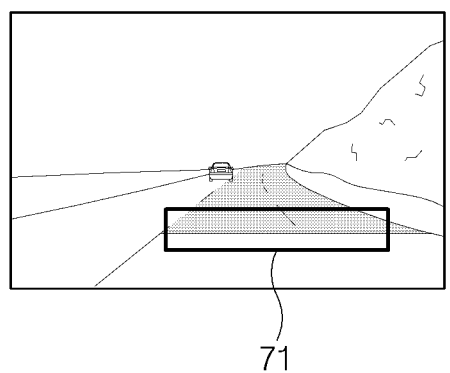

As illustrated in FIG. 6 and FIG. 7, the road surface events 61 and 71 may include a curved portion and a road seaming portion generated due to a construction of the road or the like.

Figure 8:
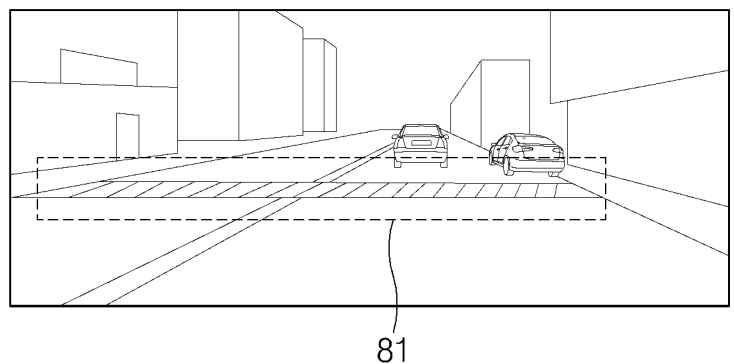

As illustrated in FIG. 8, a road surface event 81 may include a speed bump disposed on a road surface to compulsorily lower a driving speed of the vehicle.

Figure 9:
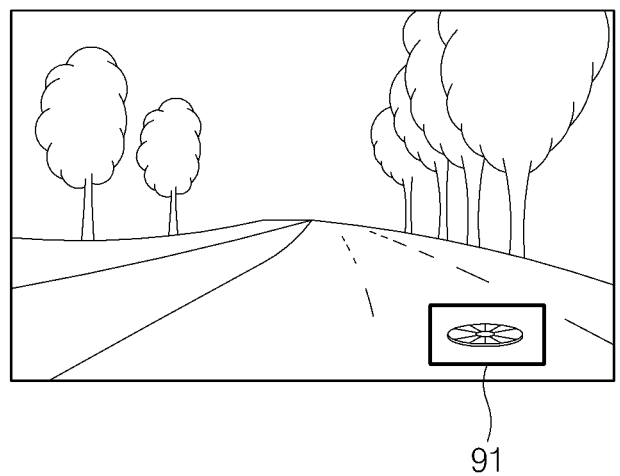

As illustrated in FIG. 9, a road surface event 91 may include a manhole, through which a person may enter or exit the ground of the road surface.

The pre-processing device 70 may pre-process the first effective image collected by the data collecting device 60 to convert the first effective image to the training data.

The pre-processing device 70 may pre-process the first effective image based on a pre-processing model. Here, the pre-processing model may be generated by the pre-processing training device 80 included in the pre-processing device 70.

The pre-processing training device 80 may generate the pre-processing model based on the second effective image. According to an exemplary embodiment of the present invention, the pre-processing training device 80 may extract a region of interest from the second effective image and train the extracted region of interest by use of a u-net scheme to generate the pre-processing model for segmentation of the road surface by training the segmentation of the road surface. For reference, the u-net refers to a 'U'-shaped network, and is originally designed to segment a medical image, and in recent years, refers to an image extracted network that also has been widely used in a 2D region.

If the pre-processing model is generated by the pre-processing training device 80, the pre-processing device 70 may pre-process the first effective image based on the pre-processing model to segment the road surface from the first effective image. A more detailed description thereof will be made with reference to FIG. 10.

Figure 10:
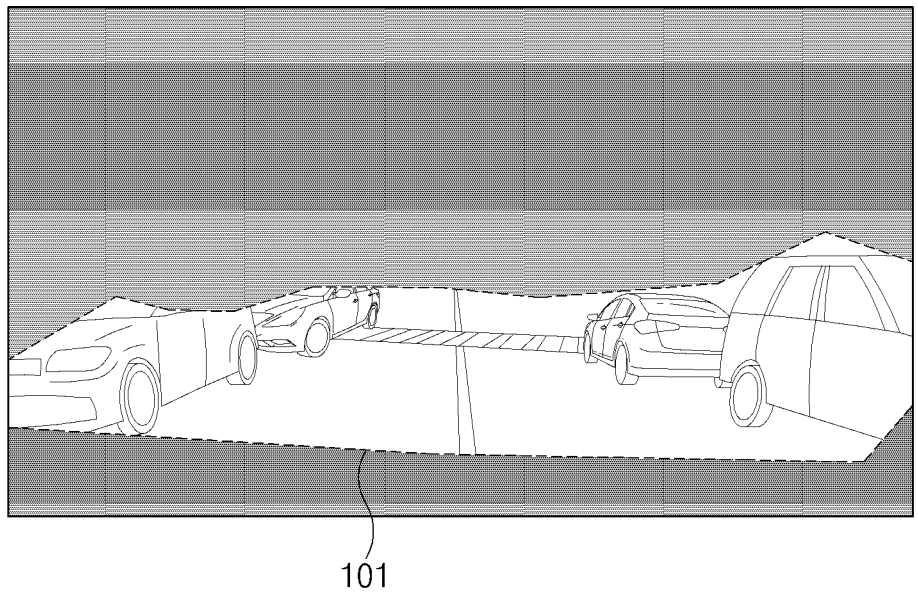
FIG. 10 is a view exemplarily illustrating the first effective image that has been pre-processed.

FIG. 10 is a view exemplarily illustrating the first effective image that has been pre-processed.

As illustrated in FIG. 10, the pre-processing device 70 pre-process the first effective image based on the pre-processing model, the road surface may be segmented from the first effective image, and accordingly, an image 101 of a segmented road surface may be acquired as a pre-processing result of the first effective image.

The pre-processing device 70 may detect a vehicle from the image of the segmented road surface, and may occlude the detected vehicle such that only the road may be included in the image 101 of the road surface. A more detailed description thereof will be made with reference to FIG. 11.

Figure 11:
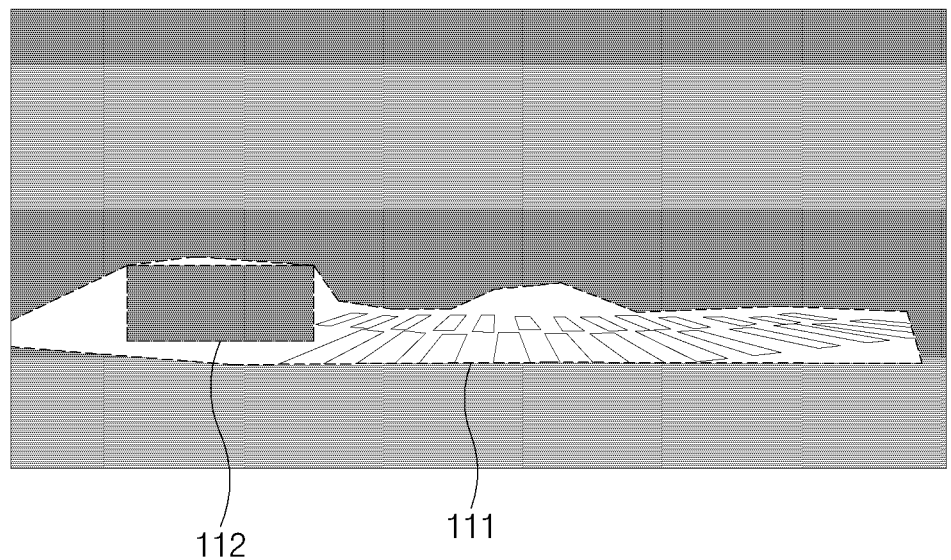
FIG. 11 is a view exemplarily illustrating a state in which a vehicle is occluded from an image of segmented road surfaces.

FIG. 11 is a view exemplarily illustrating a state in which a vehicle is occluded from an image of divided road surfaces.

As illustrated in FIG. 11, the pre-processing device 70 may detect a vehicle 112 from the image of the segmented road surface. According to an exemplary embodiment of the present invention, the pre-processing device 70 may detect the vehicle 112 by use of a pre-trained single shot multi-box detector (SSD) mobile network based on PASCAL visual object classes (VOC) data. The pre-processing device 70 may occlude the detected vehicle 112 such that only the road may be included in the image 111 of the road surface.

The training device 90 may perform training for the pre-processed first effective image. The training device 53 may train the first effective image in a training scheme using a region convolution neural network (R-CNN). For reference, the region convolution neural network may refer to a scheme in which about 2000 regions of interest (ROI) for the first effective image and the regions of interest are trained by use of a convolution neural network. Accordingly, the region convolution neural network refers to an algorithm which is optimized such that a 2-dimensional image may be easily trained.

The training device 90 may determine 4096 neural networks by use of a Microsoft cognitive toolkit (CNTK), and may perform training by use of at least three CNTKs. The training device 90 may generate a road surface detection model for classifying road surface events by training the pre-trained first effective image.

The classification device 100 may classify the road events included in the image obtained by the camera 10 based on the road surface detection model. For example, a speed bump is included in the image obtained by the camera 10, the classification device 100 may classify an obstacle detected from the road surface of the front side of the vehicle as a speed bump based on the road surface detection model. The classification device 100 may classify a port hole, a speed bump, a manhole, a convexo-concave portion, a road seaming portion, and the like.

If a road surface event is classified by the classification device 100, the processor 50 may update navigation map information based on the classified road surface event. That is, the navigation map information may be updated such that the classified road surface event may be reflected on the map while the classified road surface event is included in the map information.

Furthermore, the processor 50 may output a guide message that guides the road surface event detected while the vehicle travels on the road, based on the navigation map information in which the classified road surface event has been updated. According to an exemplary embodiment of the present invention, the guide message may be output with a voice or an image through the navigation device.

For example, the processor 50 may output a guide message of "there is a speed bump in front of the vehicle. Be careful." if determining that a speed bump is detected in front of the vehicle based on the updated navigation map information.

Furthermore, the processor 50 may control an impact absorbing device of the vehicle to improve a riding feeling of the user if a road surface event is detected while the vehicle travels on the road, based on the updated navigation map information. Here, the information related to the road surface event may include at least any one of information that the road surface protrudes and information that the road surface is recessed.

In the exemplary embodiment of the present invention, although it has been described that the operations of the data collecting device 60, the pre-processing device 70, and the training device 90 for generating a road surface detection model are performed in the processor 50, the present invention is not limited thereto, and a road surface detecting device may be operated after a device or a server provided separately from the processor 50 generates a road surface detection model and the processor 50 receives the generated road surface detection model.

Figure 12:
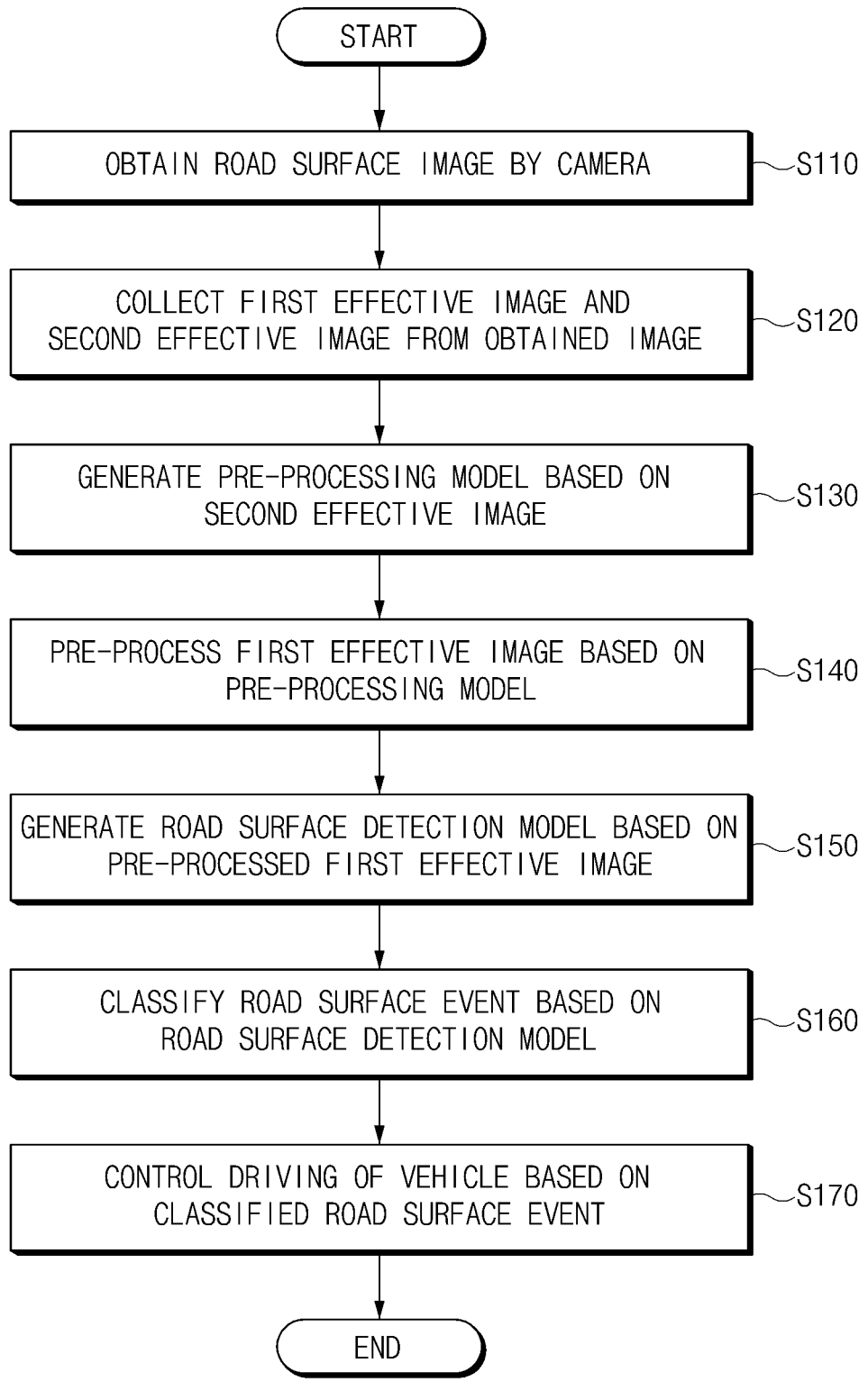
FIG. 12 is a flowchart illustrating a method for detecting a road surface according to an exemplary embodiment of the present invention.

FIG. 12 is a flowchart illustrating a method for detecting a road surface according to an exemplary embodiment of the present invention.

As illustrated in FIG. 12, first, the camera 10 obtains an image of a front side of the vehicle including a road surface (S110). Here, the image obtained in S110 may be an image used for training.

The data collecting device 60 collects a first effective image and a second effective image based on the image obtained by the camera 10 (S120). In S120, the data collecting device 60 may collect a road image in which a road surface event is included as the first effective image and collect at least any one of a road extracted image in which the road surface event is included and a general road extracted image in which a road surface event is not included as the second effective image.

The pre-processing training device 80 generates a pre-processing model based on the collected second effective image (S130). In S130, the pre-processing training device 80 may extract an interest area from the second effective image and train the extracted interest area by use of a u-net scheme to generate the pre-processing model for division of the road surface by training the segmentation of the road surface.

The pre-processing device 70 may pre-process the first effective image based on a pre-processing model (S140). In S140, the pre-processing device 70 may segment a road surface from the first effective image based on the pre-processing model.

Furthermore, the pre-processing device 70 may detect a vehicle from the image of the segmented road surface, and may delete the detected vehicle such that only the road may be included in the image of the road surface.

The training device 90 generates a road surface detection model based on the pre-processed first effective image (S150). In S150, the training device 90 may train the first effective image in a training scheme using a region convolution neural network (R-CNN) to generate a road surface detection model for classifying a road surface event.

The classification device 100 classifies the road events included in the image obtained by the camera 10 based on the road surface detection model (S160). In S160, for example, the classification device 100 may classify a road surface event in which the image obtained by the camera 10 is included as a speed bump.

If a road surface event is classified by the classification device 100, the processor 50 may update navigation map information related to the vehicle based on the classified road surface event (S170). In more detail, in S170, the processor 50 may update the navigation map information related to the vehicle by reflecting the classified event information on the navigation map information in real time.

Furthermore, in S170, the processor 50 may output a guide message that guides the road surface event detected while the vehicle travels on the road, based on the navigation map information in which the classified road surface event has been updated. According to an exemplary embodiment of the present invention, the guide message may be output with a voice or an image through the navigation device.

For example, the processor 50 may output a guide message of "there is a speed bump in front of the vehicle. Be careful." if determining that a speed bump is detected in front of the vehicle based on the updated navigation map information.

Furthermore, in S170, the processor 50 may control rolling of the vehicle generated by the road surface event. According to an exemplary embodiment of the present invention, the processor 50 may control rolling of the vehicle by controlling a motor of a suspension.

Figure 13:
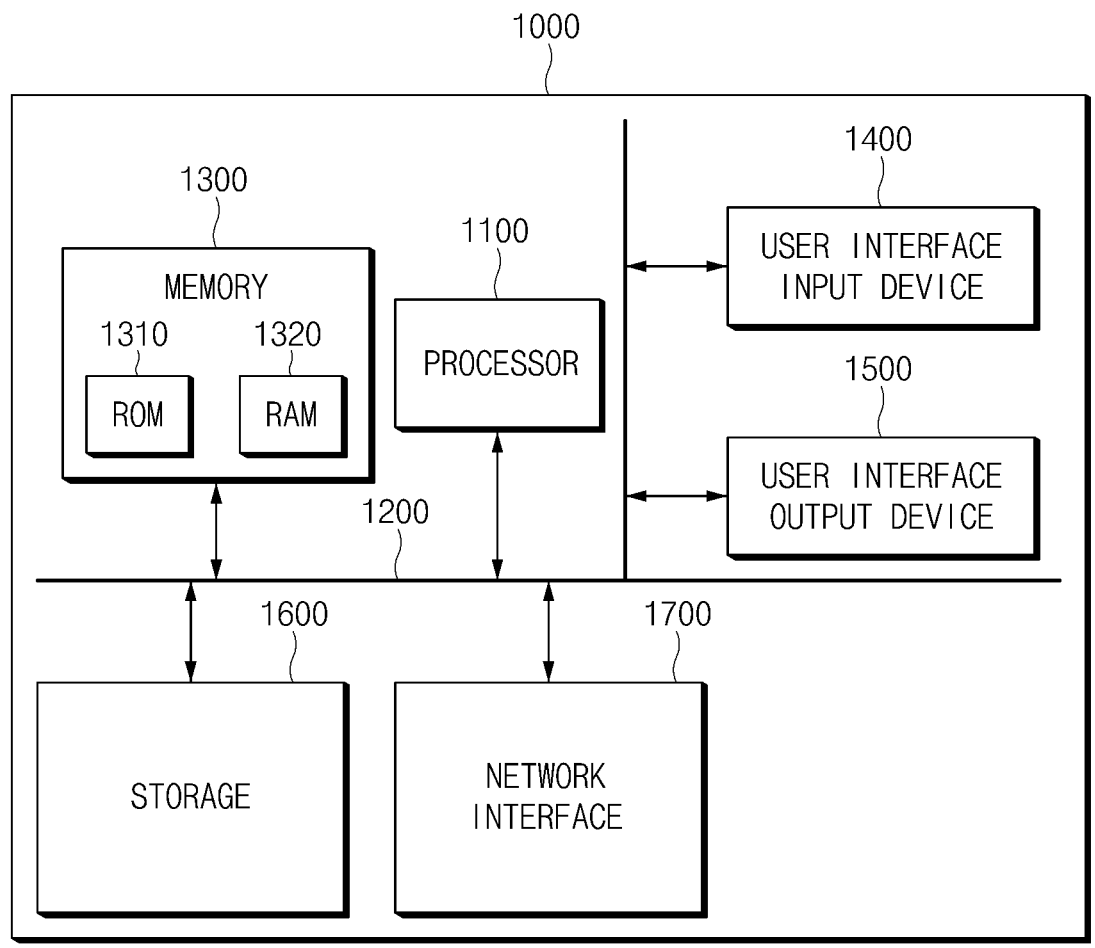
FIG. 13 is a block diagram illustrating a configuration of a computing system that executes the method according to an exemplary embodiment of the present invention.

FIG. 13 is a block diagram illustrating a configuration of a computing system that executes the method according to an exemplary embodiment of the present invention.

Referring to FIG. 13, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the road surface detecting apparatus and the method for detecting a road surface according to an exemplary embodiment of the present invention, a stable riding feeling may be provided for the user by quantitatively detecting a road surface event through training and controlling the vehicle based on the detected road surface event.

The above description is a simple exemplification of the technical spirit of the present invention, and the present invention may be variously corrected and modified by those skilled in the art to which the present invention pertains without departing from the essential features of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A road surface detecting apparatus comprising:
    a camera configured to obtain an image of a front side of a vehicle, wherein the image includes a road surface; and
    a processor configured to classify a road surface event based on a road surface detection model which is generated by performing training based on the obtained image,
    wherein the processor includes:
        a data collecting device configured to collect a first image and a second image from the obtained image;
        a pre-processing device including a pre-processing training device, wherein the pre-processing training device is configured to generate a pre-processing model by training segmentation of the road surface based on the second image, and wherein the pre-processing device is configured to pre-process the first image using the pre-processing model;
        a training device configured to generate the road surface detection model by training the pre-processed first image; and
        a classification device configured to classify the road surface event based on the road surface detection model,
    wherein the pre-processing device segments a road region from the first image based on the pre-processing model by pre-processing the first image.

2. The road surface detecting apparatus of claim 1, wherein the first image includes a road image in which the road surface event is included.

3. The road surface detecting apparatus of claim 1, wherein the second image includes at least one of a first road extracted image in which the road surface event is included and a second road extracted image in which the road surface event is not included.

4. The road surface detecting apparatus of claim 1, wherein the training device generates the road surface detection model by training the pre-processed first image based on a region convolution neural network (R-CNN).

5. The road surface detecting apparatus of claim 1, wherein the road surface event includes at least one of a state in which the road surface is protruded and a state in which the road surface is recessed.

6. The road surface detecting apparatus of claim 1, wherein the processor updates map information related to the vehicle based on the classified road surface event.

7. The method of claim 6, wherein the processor outputs a guide message that guides the road surface event based on the updated map information, wherein the road surface event is detected while the vehicle travels on a road.

8. The road surface detecting apparatus of claim 6, wherein the processor controls rolling of the vehicle generated by the road surface event, based on the updated map information, wherein the road surface event is detected while the vehicle travels on a road.

9. A method for detecting a road surface, the method comprising:
   obtaining, by a processor, an image of the road surface;
   generating, by the processor, a road surface detection model through training based on the image of the road surface; and
   classifying, by processor, information related to a road surface event by use of the road surface detection model,
   wherein the generating of the road surface detection model includes:
      collecting a first image and a second image from the obtained image of the road surface;
      generating a pre-processing model by training segmentation of the road surface based on the second image;
      pre-processing the first image using the pre-processing model; and
      training the pre-processed first image,
      wherein the pre-processing of the first image includes segmenting a road region from the first image based on the pre-processing model.

10. The method of claim 9, wherein the first image includes a road image in which the road surface event is included.

11. The method of claim 9, wherein the second image includes at least one of a first road extracted image in which the road surface event is included and a second road extracted image in which the road surface event is not included.

12. The method of claim 9, wherein the training of the pre-processed first image includes generating the road surface detection model based on a region convolution neural network (R-CNN).

13. The method of claim 9, wherein the road surface event includes at least one of a state in which the road surface is protruded and a state in which the road surface is recessed.

14. The method of claim 9, further including:
   after the classifying of the information related to the road surface event by use of the road surface detection model,
   updating map information related to a vehicle based on the classified information related to the road surface event; and
   outputting a guide message that guides the road surface event based on the updated map information, wherein the road surface event is detected while a vehicle travels on a road.

15. The method of claim 14, further including:
   after the classifying of the information related to the road surface event by use of the road surface detection model, controlling rolling of the vehicle generated by the detected road surface event, based on the updated map information.

* * * * *